United States Patent
Beach (10) Patent No.: US 9,088,837 B2
(45) Date of Patent: *Jul. 21, 2015

(54) SERIALLY-DISTRIBUTED DEVICES IN A COMMUNICATION NETWORK

(71) Applicant: SYMBOL TECHNOLOGIES, INC., Lincolnshire, IL (US)

(72) Inventor: Robert E. Beach, Los Altos, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,150

(22) Filed: Nov. 22, 2013

(65) Prior Publication Data

US 2014/0079397 A1 Mar. 20, 2014

Related U.S. Application Data (62) Division of application No. 13/193,060, filed on Jul. 28, 2011, now Pat. No. 8,705,967.

(51) Int. Cl.
*H04B 10/00* (2013.01)
*H04Q 11/00* (2006.01)
*H04L 12/40* (2006.01)
*H04B 10/2575* (2013.01)
*H04W 16/24* (2009.01)

(52) U.S. Cl.
CPC ..... *H04Q 11/0067* (2013.01); *H04B 10/25752* (2013.01); *H04L 12/40045* (2013.01); *H04L 12/40169* (2013.01); *H04W 16/24* (2013.01)

(58) Field of Classification Search
CPC .. H04B 10/11; H04B 10/112; H04B 10/1123; H04B 10/1127; H04B 10/1129; H04B 10/114; H04B 10/1143; H04B 10/1149; H04B 10/25; H04B 10/2575; H04B 10/25751; H04B 10/25752; H04B 10/25753; H04B 10/25756; H04B 10/25759; H04Q 11/0067; H04W 16/24; H04L 12/40169; H04L 12/40045
USPC .............. 398/115, 116, 118, 127, 128, 171
See application file for complete search history.

(56) References Cited

U.S. PATENT DOCUMENTS

| | | | | |
|---|---|---|---|---|
| 6,381,647 | B1 * | 4/2002 | Darnell et al. | 709/232 |
| 7,231,224 | B1 * | 6/2007 | Chesson | 455/523 |
| 7,424,224 | B2 * | 9/2008 | Feinberg | 398/104 |
| 7,620,010 | B2 * | 11/2009 | Takeda et al. | 370/328 |

(Continued)

FOREIGN PATENT DOCUMENTS

| | | |
|---|---|---|
| WO | 0171980 A1 | 9/2001 |
| WO | 0197455 A1 | 12/2001 |
| WO | 2004051322 A2 | 6/2004 |

OTHER PUBLICATIONS

International Search Report and Written Opinion dated Dec. 7, 2012 in related application PCT/US2012/047012.

(Continued)

*Primary Examiner* — Dalzid Singh
(74) *Attorney, Agent, or Firm* — Brian M. Mancini (57) ABSTRACT

Serially-distributed devices in a communication network include a cable including communication wires, a plurality of devices connected in series with the communication wires along a length of the cable, and a headend interface connected at one end of the cable and operable to provide a communication interface with the devices.

18 Claims, 5 Drawing Sheets

(56) References Cited

U.S. PATENT DOCUMENTS

| | | | |
|---|---|---|---|
| 7,848,654 B2* | 12/2010 | Sauer et al. | 398/115 |
| 8,346,091 B2* | 1/2013 | Kummetz et al. | 398/115 |
| 2002/0016875 A1* | 2/2002 | Yokoyama | 710/62 |
| 2011/0116794 A1* | 5/2011 | George et al. | 398/45 |

OTHER PUBLICATIONS

"Wireless LAN Access Network System for Moving Vehicles" by Toshiya Okabe et al, Proceedings of the 10th IEEE Symposium on Computers and Communications (SCC 2005).

* cited by examiner

FIG. 5

SERIALLY-DISTRIBUTED DEVICES IN A COMMUNICATION NETWORK

CROSS-REFERENCE TO RELATED APPLICATION

This application is a divisional application of U.S. application Ser. No. 13/193,060, filed Jul. 28, 2011, and claims the benefit of priority therefrom, the entire contents of which are hereby incorporated by reference.

FIELD OF THE DISCLOSURE

The present invention relates generally to communication networks, and more particularly to serially-distributed devices in a communication network.

BACKGROUND

Figure 1:
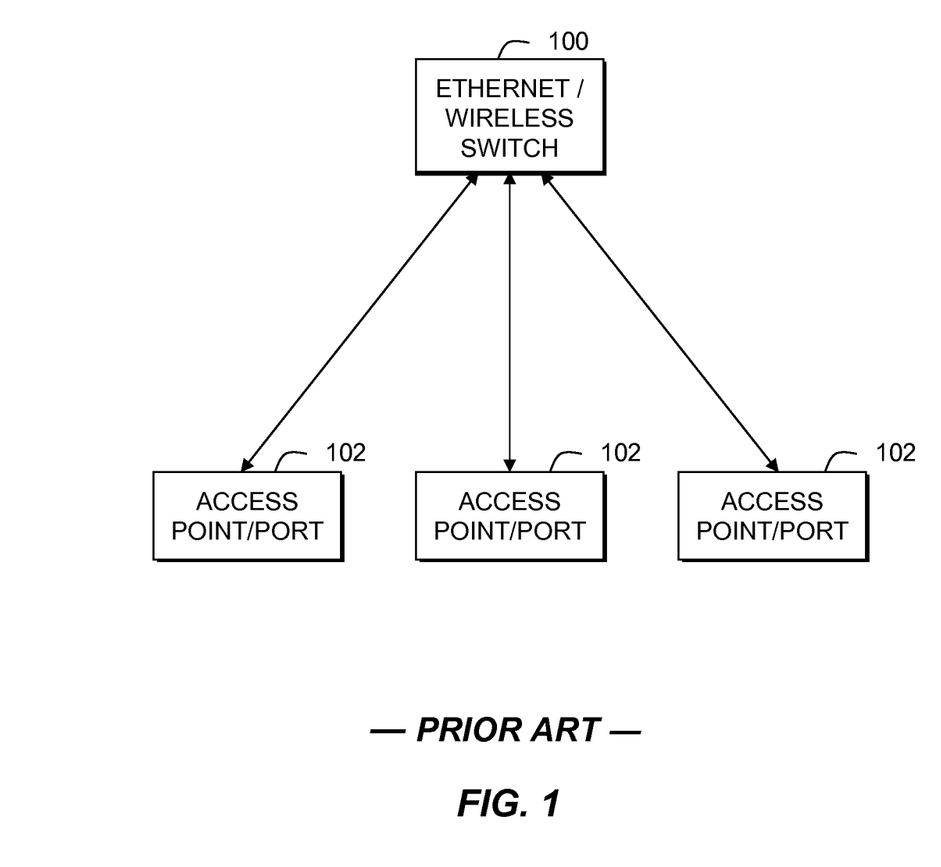
FIG. 1 is a simplified block diagram of a prior art system.

A problem for vendors of wireless communication networks, and particularly for vendors of Wi-Fi, or IEEE 802.11 wireless local area network (WLAN) communication systems, is the ability to provide sufficient coverage within an area at an efficient cost. For the most part, current Wi-Fi networks are built using one of two basic models as shown in FIG. 1: standalone (or thick) access points 102 connected to an Ethernet switch 100, or a combination of a wireless switch 100 and (thin) access points (i.e. access ports) 102. These two models are actually quite similar and differ only in the functional partitioning between the infrastructure devices and the access points. In the thick access point model, all the wireless functionality is located in the access point which is wired into an Ethernet switch, while in the wireless switch model some functions of the access point move into the wireless switch, which may itself be standalone or integrated into a regular wired Ethernet switch.

The access points are typically provided with both power and network connectivity via a Power over Ethernet (PoE) connection. The wired Ethernet switch 100 must incorporate POE capability in order to supply power to the access points, although separate POE adapters may be used between the switch and access points. As shown in FIG. 1, the prior art configuration is essentially a parallel configuration with each access point 102 individually connected to a central switch 100. In general the switch and the access points must be located within one hundred meters of one another. This requires wiring closets within a range of one hundred meters from any access point. In addition, there must be a wired Ethernet port with POE for each access point, and therefore the switch must be within one hundred meters of the AP. The cost of such as installation process can approach or even exceed the cost of the access point itself.

The unit costs of access points as well as the installation costs have lead the industry to focus on getting as much capacity out of a single access point as possible. Hence the popularity of IEEE 802.11n networks, and especially multiple stream, multiple-input multiple-output configurations. However, slower legacy 802.11b/g devices limit 802.11n operation and performance Accordingly, there is a need to provide an improved communication network with the ability to provide sufficient coverage in an area at a low cost.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides an improved communication network with the ability to increase coverage in an area at a low installation cost. In particular, the present invention serially-distributes a set of low-cost consumer-grade access points along a single cable. The cable would carry both power and network connectivity for all the serially-connected access points along the cable. In practice, consumer-grade access points can be made quite small, and it is envisioned that these devices can be made part of the cable itself. As a result, simply stringing the cable within a location will provide not only a low-cost network, but also a high-capacity network with minimal installation cost. Advantageously, the present invention avoids the need to run parallel cables between Ethernet hubs and each access point, and can instead embed the access points within one single cable.

Figure 2:
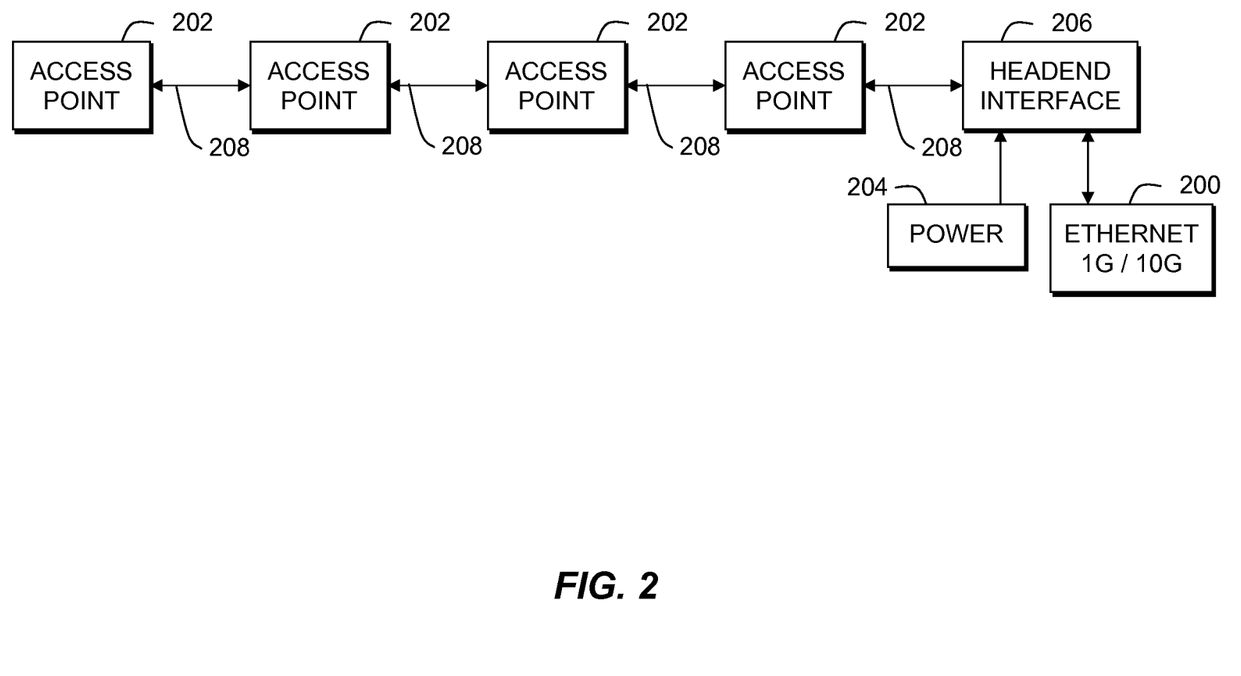
FIG. 2 is a simplified block diagram of a system, in accordance with one embodiment of the present invention.

FIG. 2 is a block diagram depiction of a communication network, in accordance with one embodiment of the present invention. The communication network can comprise local and wide-area networks, or other IEEE 802.11 communication systems. However, it should be recognized that the present invention is also applicable to other wired or wireless communication systems. For example, the description that follows can apply to one or more communication networks that are IEEE 802.xx-based, employing technologies such as IEEE's 802.11, 802.16, or 802.20, modified to implement embodiments of the present invention.

Those skilled in the art will recognize that FIG. 2 does not depict all of the equipment necessary for system to operate but only those system components and logical entities particularly relevant to the description of embodiments herein. For example, servers, routers, switches, and access points can all includes separate processors, communication interfaces, transceivers, memories, etc. In general, components such as processors, transceivers, memories, and interfaces are well-known. For example, processing units are known to comprise basic components such as, but not limited to, microprocessors, microcontrollers, memory cache, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations.

Referring back to FIG. 2, a series of access points (APs) 202 are serially distributed along a single cable 208. The APs can be distributed at regular or irregular intervals. The distance between the APs is small enough so as to create many microcells. The cable 208 carries both power and network connectivity, which could both be provided on the same conductors of the cable. However, it is simpler to provide power and network connectivity using different conductors within the cable. At one end of the cable 208 there is a headend interface 206 which supplies both power 204 and a standard interface to a wired network 200, which can include Ethernet 10 G or multiple 1 G connections, for example. The interface 206, power distribution module 204, and Ethernet connections 200 could be provided in a single physical module or in discreet modules.

The chipsets of the APs 202 in the example shown can be spaced at fifteen to thirty foot intervals. Transmit power would be about one milliwatt, which is enough to form a microcell. In one embodiment, the APs could utilize IEEE 802.11n chipsets and protocols that could have a single radio with single transmit/receive antennas (1×1) or possibly dual radios with dual transmit/receive antennas (2×2), depending on cost. The cable itself can be any length, up to a thousand feet or more, depending on signal limitations. Preferably, each AP would operate on only one channel of a frequency band (2.4 or 5.2 GHz) and APs of these different channels would have an interleaved position with one another on the cable such that access points operating on the same channel are not located next to each other. Due to the microcell architecture of the present invention, the interleaving of the APs/channels will avoid interference.

Physically the APs themselves can be made quite small. Given the present level of integration of Wi-Fi AP chipsets, an entire AP of the present invention can be provided on a printed circuit board with an area of about one-inch by two-inch, including a mounted antenna(s). Therefore, the AP chipsets can be integrated within a sheath of the cable, with the only indication of an AP being a "bulge" in the cable every fifteen to thirty feet. As a result, the communication network (i.e. the cable itself) could be quite easy to install by simply stringing the cable wherever coverage is needed.

It is envisioned that each AP in the cable would have a connection to both a twisted pair of power wires and a set of network communication wires. There is no "plug" for the APs, and any unused APs can be directed to power down by commands on the network wires or other control wires from the headend interface. Neither the power wires nor the network wires need conform to any standard and hence can be highly optimized for the particular application. The power wires could provide AC or DC power. In one embodiment, DC power can be provided on the power wires, and the network wires are 10 G Ethernet (or multiple 1 G) connections, which could easily plug into an Ethernet switch without the need for a Power over Ethernet (POE) connection. The functional partitioning between the APs 202 and interface 206 can vary greatly. At one extreme each AP can be a standalone, thick AP, and the interface would have little intelligence. At the other extreme, which is preferred, each AP can be a thin device that handles only lower Media Access Control functions, and the headend interface acts much like a wireless switch for all the APs.

Installing the system would be quite easy since the cable could be simply strung in a building (e.g. in a straight line or weaved throughout a ceiling of the building), where one end of the cable would be attached to the headend interface. The actual arrangement or placement of the cable determines the capacity of the network, which is determined by how many APs are in a given area. A cable strung in a straight line would have fewer APs per given area, while a cabled that is woven back and forth would have more APs per given area. The more cable installed in a given area, the more capacity is available. It is also envisioned that cables could be coupled in series, as long as a maximum length is not exceeded.

The present invention has several advantages over a conventional Wi-Fi installation. The first is the flexibility of easily installing as much capacity per area as required. For basic connectivity, one can simply run the cable in a straight line. For more capacity, the cable can be woven back and forth. The second is the ease of installation. Rather than installing many heavy APs within an area and then installing a cable to each one, the present invention simply involves installing one cable. The third is reduced cost which results from: using consumer-grade AP chipsets instead of enterprise-grade chipsets, no AP requirement for a power amplifier since output power is low, simple AP packaging, using simple AC-DC converters for the APs instead of POE circuitry, using an integrated AP antenna instead of an external antenna, operating each AP on only a single frequency, and not requiring POE interfaces on the Ethernet switch.

In practice, the present invention could use single frequency (1×1) IEEE 802.11n APs chipsets rather than multiple band/stream devices. There are several rationales for this. The first is cost, since single-band, single-stream units are simply cheaper than other units. For example, there are AP chipsets that are optimized for the low cost, home market that could be used for this system. Second, the single frequency chipsets consume less power, which is a significant issue when placing up to fifty APs along a thousand foot long cable. Third, the additional capacity that more streams would offer is more than offset by the capacity of a large number of cheap microcells. In one sense, the present invention offers multiple streams by dividing up the area in to many smaller cells that do not interfere with one another. It may be that 2×2 devices are equally low cost and they could be used instead to further increase capacity.

The power wires of the cable must be able to power all the APs. Prior art POE implementations have been limited to 24 AWG wire. For example, the current 802af POE can provide fifteen watts and 802at provides thirty watts. However, the present invention is not restricted to POE limitations, and can use a much higher gauge wire. Low-cost 12-2 wire is presently available for low voltage applications and could be used in the present invention. According to the National Electric code, 12-2 wire can carry up to 9.5 A at 48V, which is more than sufficient to power up to fifty APs spread out over a thousand foot length, as envisioned in the present invention.

The network communication wires of the cable have different design considerations, in that the network wires must carry packet communications between the headend interface and all the APs. This requires supporting several gigabits/second in each direction for a thousand feet. Therefore, it is preferred than the network wires are fiber optic, although this is not a requirement. For example, the cable can include power cable and a passive optical network (PON) cable where the fiber optic cable includes passive splitters at each AP to tap the network signals. Communications on the network wires can be full duplex, even though it is likely that most of the traffic will be coming from the interface to the APs and much less in the other direction. Communications with the APs could be arbitrated using a polling loop or token ring/bus configuration. However, the round trip polling time would be relatively large compared to the time required to transmit a packet. Shared Ethernet could also be used, but at a thousand feet and two gigabits/second, the efficiency would be low. It is envisioned that the present invention can use time division multiplex (TDM) scheduling where the headend interface can schedule particular time slots for each AP to send upstream packets.

Given the microcell architecture of the present invention, only rudimentary antennas are needed, which can be integrated within the cable at each AP. Accordingly, a simplest embodiment of the present invention can use internal, omnidirectional antennas if it is difficult to control the antenna orientation as the cable is installed. However, if antenna orientation can be controlled during cable installation, then it is preferred to use directional antennas, such as antennas having conical coverage, for example.

Because of the microcell architecture of the present invention, the number of clients per AP will likely be much smaller than prior art systems. This allows an AP to optimize the network behavior to suit the capability of the few clients associated with it. Hence if only 2×2 clients are associated with a 2×2 AP, no concessions need be made for 1×1, 802.11g, or 802.11b clients. Likewise an AP that finds itself with only 802.11b clients can adjust its operating capacity accordingly, perhaps further reducing output power given the higher sensitivity of 802.11b receivers compared to 802.11g or 802.11n receivers. This allows more frequency reuse.

Figure 3:
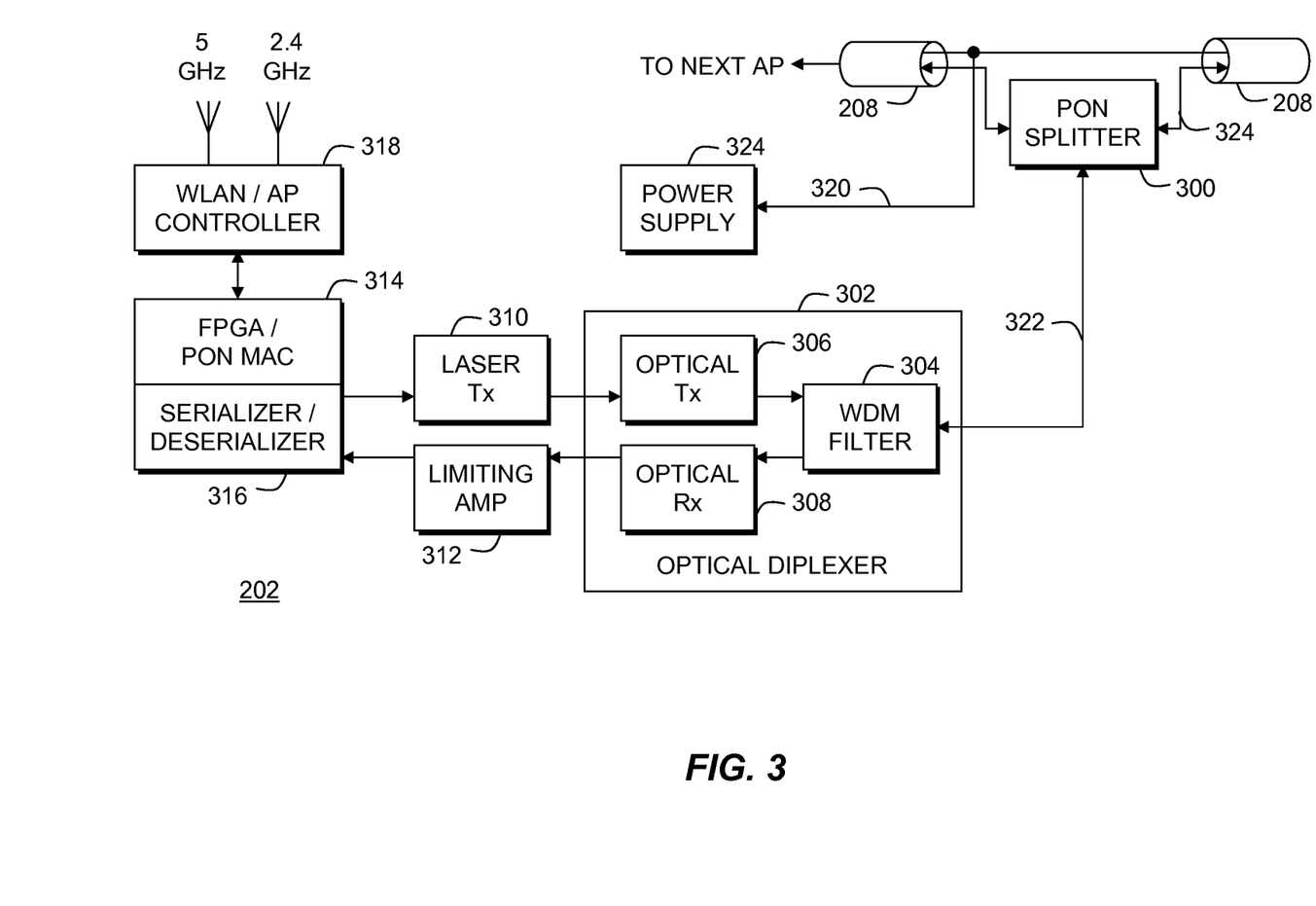
FIG. 3 is a simplified block diagram of an access point, in accordance with the present invention.

FIG. 3 shows an embodiment of an access point in accordance with the present invention. The cable 208 supplies a twisted pair of power wires 320 to the AP 202. The power wires 320 feed a power supply 324 of the AP that powers all the components of the AP. The cable also includes a PON network communication cable 324 with a passive optical network (PON) splitter 300 at the AP. The splitter taps network signals 322 off the cable 324 for the AP. The AP includes an optical diplexer 302 to receive the signals 322. Optical diplexers are commercially available and are typically operable at 2.5 Gbits.

The optical diplexer is operable using two different optical wavelengths, i.e. wavelength-division-multiplexing (WDM), where one wavelength is used for receiving signals from the headend interface and another wavelength is used for transmitting signals to the headend interface. It is envisioned that the optical channel uses a full duplex configuration using WDM. Downstream packet transfer from the headend would be a simple broadcast of packets at a first wavelength on the optical cable. All the APs would be able to capture these downstream packets and then discard those packets that are not addressed to a mobile device that is associated with the AP. Upstream packet transfer from the APs to the headend would comprise time-slotted transmissions of packets at a second wavelength on the optical cable. However, it is not desired for any AP along the cable to intercept or act on these upstream packets. Therefore, the optical diplexer of each AP includes a WDM filter 304 that will pass upstream packets from an optical transmitter 306 at the second wavelength but block an optical receiver 308 from receiving any packets at the second wavelength. The WDM filter will be able to pass downstream packets at the first wavelength to the optical receiver 308. In this way, each AP will not be able to "see" packets sent from any other AP since the packets are sent on the second wavelength that APs cannot detect. Only the headset has a suitable photo receiver at the second wavelength.

The optical receiver 308 can pass received signals through a limiting amplifier 312 to a deserializer 316 of a processor, such as a field programmable gate array (FPGA) 314. The deserializer is used to buffer packets for the AP since the packets can come at a faster rate than the APs controller 318 can handle (e.g. 2.5 Gbits versus 1 Gbit). The FPGA 314 provides a Media Access Control (MAC) function for the received PON packets and supplies these packets to the WLAN/AP controller 318, which can communicate with any associate mobile device in the microcell using one or more channel/antenna. Fortunately, it is envisioned that there would be only a few mobile devices associated with each AP and so the FPGA can have a relatively simple configuration. The FPGA also includes a serializer 316 to take packets from the controller 318 and provide higher speed PON packets to a laser transmitter 310 that feeds the optical transmitter 306. The serializer/deserializer 316 serves for buffering of optical packet information.

Figure 4:
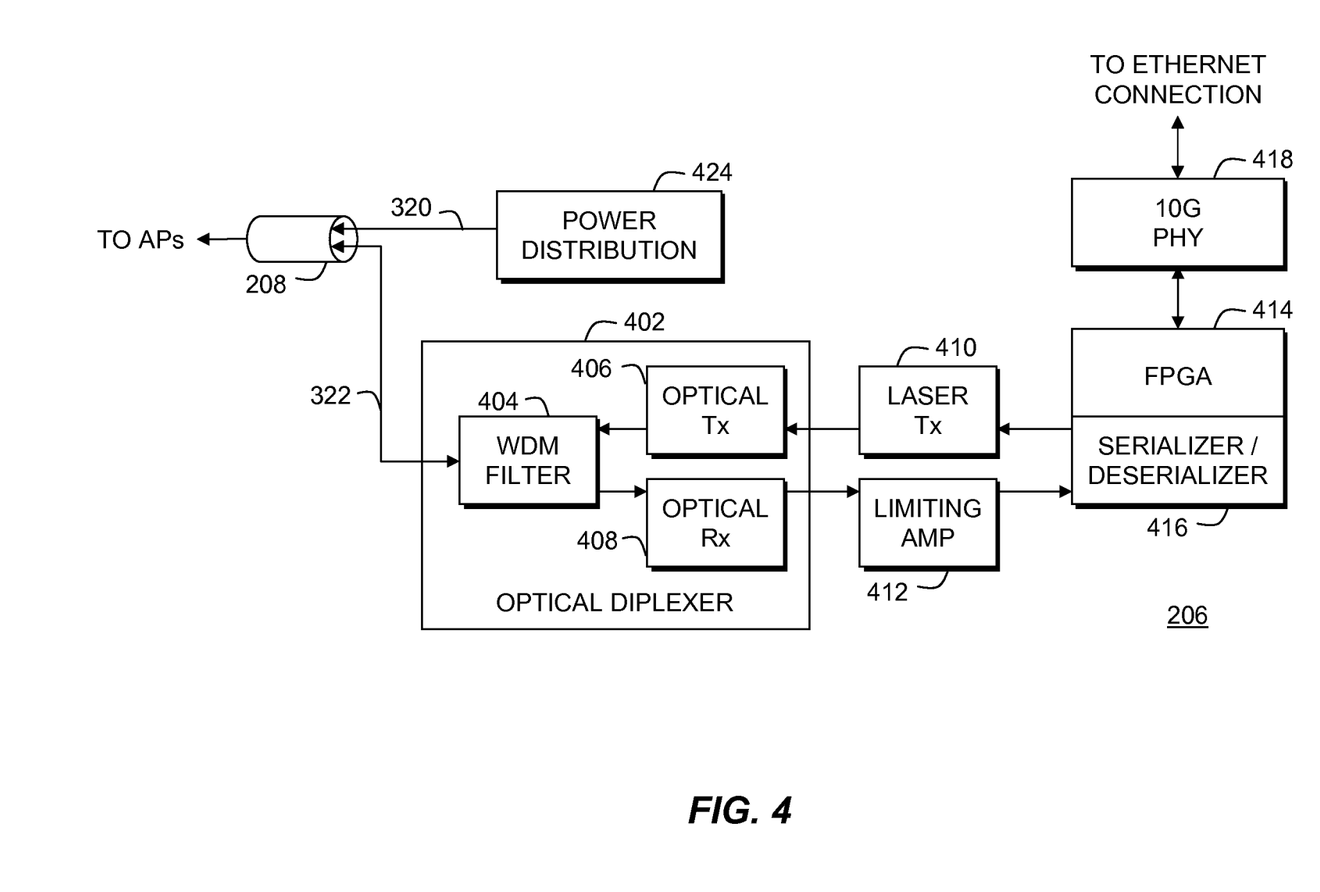
FIG. 4 is a simplified block diagram of a headend interface, in accordance with the present invention.

FIG. 4 shows an embodiment of a headend interface 206 in accordance with the present invention. A power distribution module 424 provides power to the twisted pair power cable 320. The power distribution module 424 can include a transformer and a converter to convert standard AC mains power to either AC or DC power for the APs. The interface 206 includes an optical diplexer 402 similar to the optical diplexer of the APs with the exception that the WMD filter 404 can receive and "see" packets 322 sent upstream from the APs at the second wavelength. Of course the optical diplexer can send packets downstream to the APs at the first wavelength. The interface also includes a laser transmitter 410 limiting amplifier 412 that operate similarly to those of the AP. A processor, such as a FPGA 414, is provided with a serializer/deserializer 416. It is envisioned that this FPGA would be more complicated than the FPGA of the AP since it would be handling all the communications from the APs while providing a 10 G physical layer interface 418 for the Ethernet connection.

Figure 5:
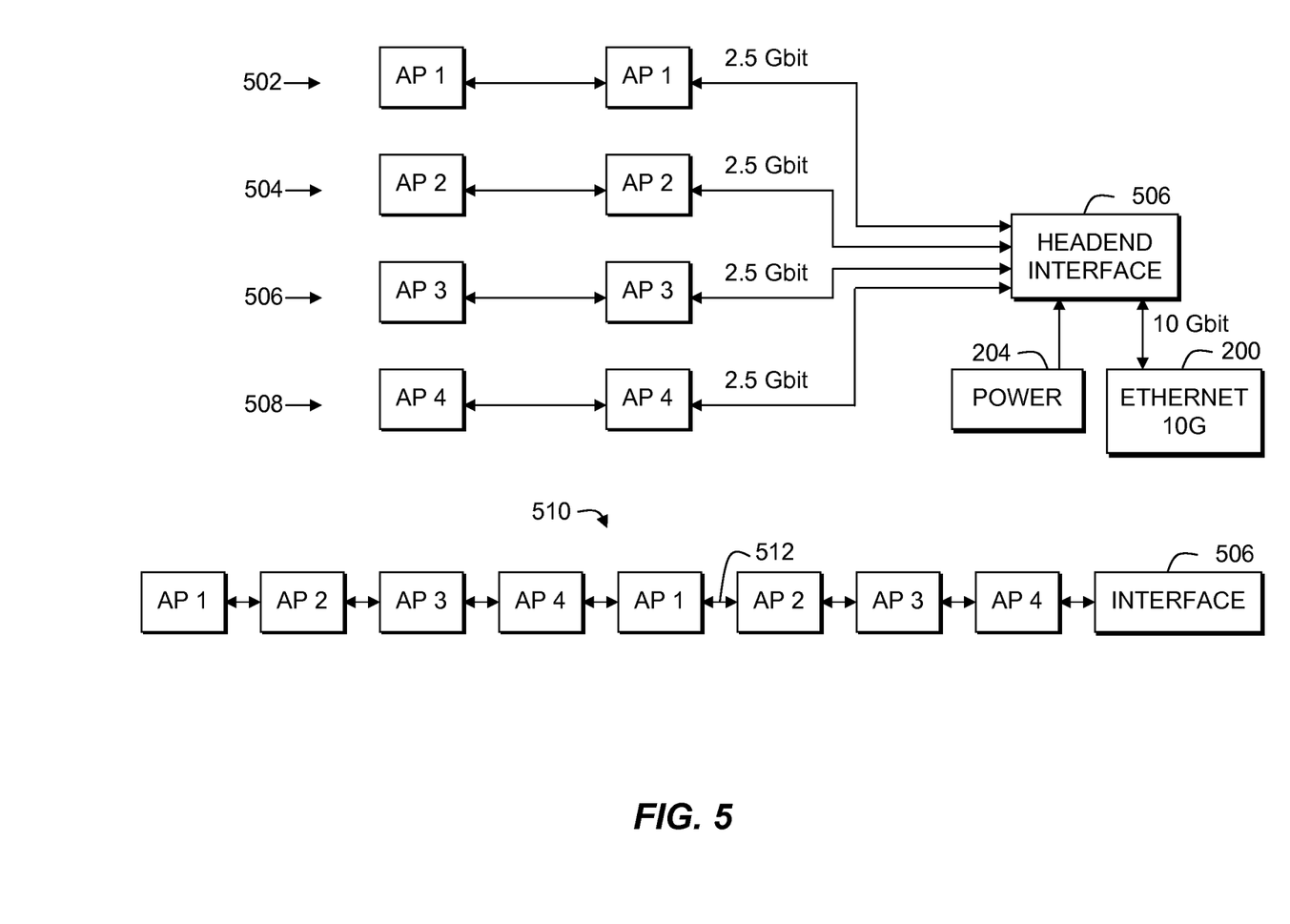
FIG. 5 is a simplified block diagram of a system, in accordance with another embodiment of the present invention.

FIG. 5 shows another embodiment of the present invention. Since the commercially available optical diplexers of the present invention can operate at 2.5 Gbit while an Ethernet connection can operate at 10 Gbit, this embodiment envisions multiplexing four 2.5 Gbit PON cables 502, 504, 506, 508 into the headend interface 506 for interfacing with a 10 Gbit Ethernet connection 200. The headend interface 506 would be modified to include four sets of the components 402-412 from FIG. 4 for each cable, while the one FPGA would be modified to include four serializer/deserializers. Each cable 502, 504, 506, 508 would be configured the same as the previous embodiment, and it is envisioned that these four cables could be implemented within one master cable 512. In this case, the APs from each cable could be interleaved 510 in the master cable such that APs from one cable would not be positioned next to each other.

In the above embodiments, it is envisioned that access points along the cable could be replaced by other devices such as radio frequency sensors, radio frequency identification readers, cameras or other video devices, and any other device that can utilize a general purpose data and power interface provided by the present invention.

Advantageously, the present invention defines a technique by which low-cost access point chipsets are used to build an enterprise-class communication network. This is accomplished by embedding many low-cost, consumer grade access point chipsets into a single cable. The distance between the chipsets is small enough so as to create many microcells. Consumer-grade access point chipsets are available for a fraction of the cost of enterprise-grade access point chipsets. As a result, the present invention provides increased coverage at a lower cost over current enterprise IEEE 802.11 communication networks that are built using a few very high performance access points with high priced chipsets.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for serially-distributed devices, comprising:
    a cable including communication wires comprising at least one fiber optic cable that includes a passive optical splitter at each device and power wires for powering the plurality of devices;
    a plurality of devices connected in series with the communication wires along a length of the cable; and
    a headend interface connected at one end of the cable and operable to provide a communication interface with the devices along the communication wires, wherein each device includes an optical diplexer operable using two different optical wavelengths, wherein a first wavelength is used for receiving signals from the headend interface and a second wavelength is used for transmitting signals to the headend interface, and wherein the optical diplexer includes a filter operable to pass upstream packets to the headend interface at the second wavelength, block the reception of any packets at the second wavelength, and pass downstream packets from the headend interface at the first wavelength.

2. The apparatus of claim 1, wherein the headend interface couples power from a power distribution module to the power wires and couples the communication wires to an Ethernet device without the need for a Power over Ethernet connection.

3. The apparatus of claim 1, wherein the devices are cameras.

4. The apparatus of claim 1, wherein the devices are radio frequency identification readers.

5. The apparatus of claim 1, wherein the devices are integrated within a sheath of the cable.

6. The apparatus of claim 1, wherein the devices and headend interface each include a processor including a serializer/deserializer for buffering of optical packet information.

7. The apparatus of claim 1, wherein the communication wires comprise a plurality of fiber optic cables within one master cable, wherein the plurality of fiber optic cables are multiplexed into the headend interface.

8. The apparatus of claim 7, wherein the devices from each cable are interleaved in the master cable such that devices from one cable are not positioned next to each other.

9. The apparatus of claim 1, wherein the headend interface controls time division multiplex scheduling for the devices to send upstream packets to the headend interface.

10. An apparatus for serially-distributed devices, comprising:
   a cable including communication wires comprising at least one fiber optic cable that includes a passive optical splitter at each device and power wires for powering the plurality of devices;
   a plurality of devices connected in series with the communication wires along a length of the cable; and
   a headend interface connected at one end of the cable and operable to provide a communication interface with the devices along the communication wires, wherein each headend interface includes an optical diplexer operable using two different optical wavelengths, wherein a first wavelength is used for transmitting signals from the headend interface and a second wavelength is used for receiving signals into the headend interface, and wherein the optical diplexer includes a filter operable to pass downstream packets from the headend interface at the first wavelength and pass upstream packets from the devices at the second wavelength.

11. The apparatus of claim 10, wherein the headend interface couples power from a power distribution module to the power wires and couples the communication wires to an Ethernet device without the need for a Power over Ethernet connection.

12. The apparatus of claim 10, wherein the devices are cameras.

13. The apparatus of claim 10, wherein the devices are radio frequency identification readers.

14. The apparatus of claim 10, wherein the devices are integrated within a sheath of the cable.

15. The apparatus of claim 10, wherein the devices and headend interface each include a processor including a serializer/deserializer for buffering of optical packet information.

16. The apparatus of claim 10, wherein the communication wires comprise a plurality of fiber optic cables within one master cable, wherein the plurality of fiber optic cables are multiplexed into the headend interface.

17. The apparatus of claim 16, wherein the devices from each cable are interleaved in the master cable such that devices from one cable are not positioned next to each other.

18. The apparatus of claim 10, wherein the headend interface controls time division multiplex scheduling for the devices to send upstream packets to the headend interface.

* * * * *